No. 612,663. Patented Oct. 18, 1898.
G. C. HAUBS.
BICYCLE STAND.
(Application filed Aug. 9, 1897.)
(No Model.)
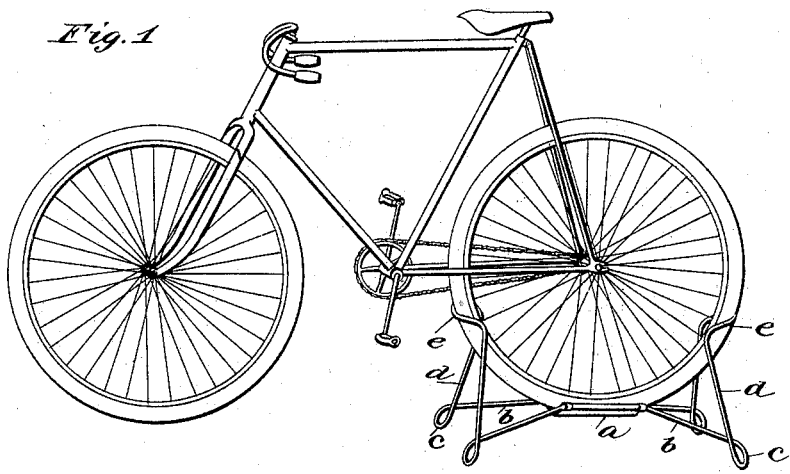
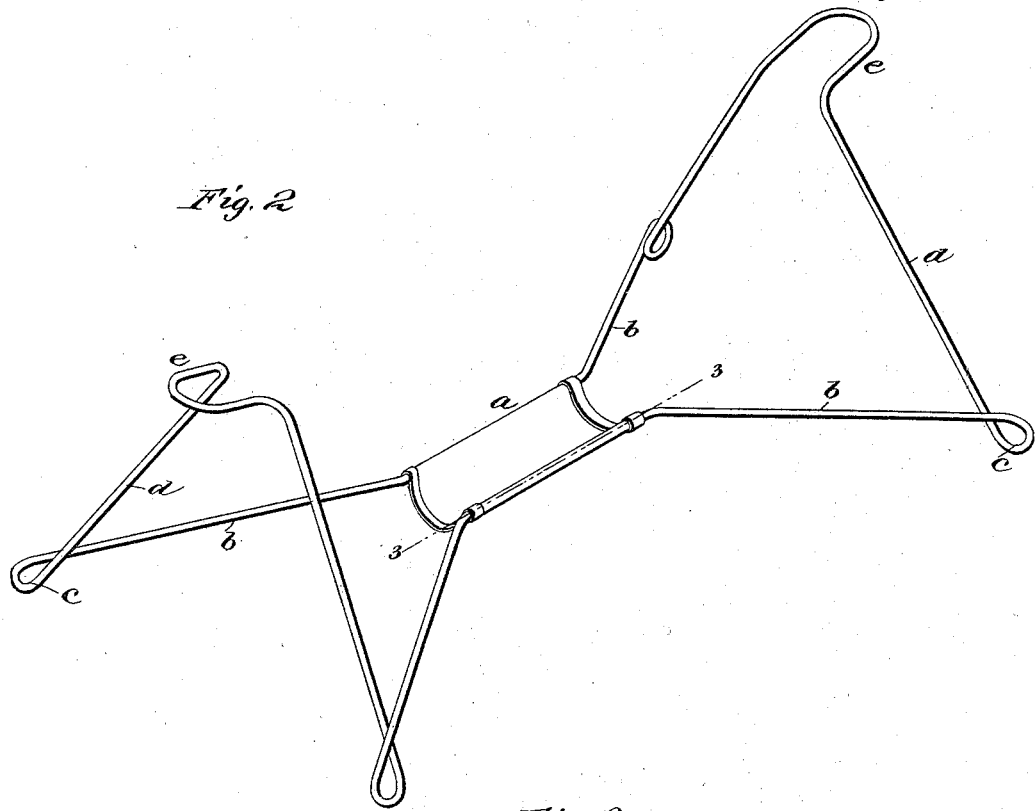
Witnesses. Inventor.
George C. Haubs.
by Arthur W. Harrison
Attorney.

UNITED STATES PATENT OFFICE.

GEORGE C. HAUBS, OF ST. LOUIS, MISSOURI.

BICYCLE-STAND.

SPECIFICATION forming part of Letters Patent No. 612,663, dated October 18, 1898.

Application filed August 9, 1897. Serial No. 647,597. (No model.)

*To all whom it may concern:*

Be it known that I, GEORGE C. HAUBS, of St. Louis, in the State of Missouri, have invented new and useful Improvements in Automatic Bicycle-Stands; and I do hereby declare the following to be a full, clear, and exact description of said invention, reference being had to the accompanying drawings, and to the letters of reference marked thereon, which form a part of this specification.

This invention relates to devices for supporting bicycles in upright position; and my object is to produce a light, simple, and inexpensive stand which will automatically accommodate itself to varying sizes of wheels, will support the wheel at three points against lateral movement, and which may be readily slid about over the floor when the bicycle supported thereby is moved.

To these ends my invention consists in the construction and combination of parts substantially as hereinafter described and claimed.

In the accompanying drawings, Figure 1 represents a perspective view of the stand and a bicycle supported thereby. Fig. 2 represents a perspective view of the stand, drawn to a larger scale than in Fig. 1. Fig. 3 represents a section on the line 3.3 of Fig. 2.

Similar reference characters indicate similar parts throughout the several views.

The stand is composed of two wire portions which are connected by a horizontal trough, preferably of tin or other sheet metal, which receives the lower portion of the wheel rim and tire, while the wire portions are each provided with a loop or recess to embrace the wheel rim and tire at points above and in front and rear of the trough.

The trough or receiver is represented at $a$, and to the edges thereof the wire is secured by suitable means, such as by bending the edges of the trough around the wire and soldering the parts securely together. From the two edges of the trough, at each end thereof, the wires diverge, as at $b$, and are bent around to form coils at $c$, which increase the elasticity of the frame as a whole and also constitute the feet of the device, and from the coils or feet $c$ the wires rise and converge at each end, as at $d$, toward the bends or loops $e$, which are preferably turned outward, as shown. Preferably the uprights at each end, which are formed by the portions $d$ of the wire, are inclined somewhat inward or toward each other and the trough, for the purpose presently described.

The wire may be of a single piece, the ends being secured in and by one of the rolled edges of the trough; but preferably I make it of two pieces, the ends being secured in both of said rolled edges.

When a wheel is placed in the stand, as shown in Fig. 1, the uprights $d\ d$ are spread apart more or less by the wheel, according to the size of the wheel relatively to the normal spread of the loops or retainers $e\ e$. Owing to the normal inward inclination of the uprights, as above described, the device is adapted to fit a greater range of sizes of wheels than if said uprights inclined outward from the fixed points of support at $c\ c$. This, as will be readily understood, is due to the fact that the loops $e\ e$ may be moved a considerable distance apart without materially altering their height above the central receiver or trough.

The trough or receiver $a$ and the sections $b$ of wire rigidly secured thereto constitute a resilient base portion, the central part (the trough) being normally supported above the floor at such a distance as will permit it to yield or move downward under the weight of the wheel, and thus tend to force the loops $e$ more closely to the wheel, this being due to the operation of the two wire portions at each end of the trough as levers the fulcrums of which are at the points of support on the floor.

Ordinarily the receiver or trough is not depressed to the floor by the weight of the machine supported thereby, and therefore the only resistance to a sliding movement over the floor is the slight friction of the rounded surfaces of the coils or feet $c$ on said floor. This friction is in practice so slight that the machine may be easily moved about for exhibition purposes or for changing its location, the stand following the machine without turning up or over with the wheel resting therein.

The fact that the stand as a whole is elastic, there being absolutely no castings or other rigid parts, enables it to be subjected to rough usage without damage, and owing to the frame being resilient at all yielding points, there being no hinged connections, the device is always ready for use, requiring no manipulation, such as unfolding or adjusting.

Having now described my invention, I claim—

1. A bicycle-stand, comprising in its construction a resilient base with a central raised wheel-rest, and resilient supporting-standards at each end of the base provided with wheel-retaining loops.

2. A bicycle-stand comprising in its construction a horizontal trough-shaped receiver, wires diverging therefrom in different directions and rigidly connected thereto, and provided with bent portions constituting feet adapted to rest on the floor and support the trough above the same, the said wires being also bent to form wheel-retaining means in line with and above the plane of the receiver.

3. A bicycle-stand, comprising in its construction a resilient base portion, having at its center an elongated trough-shaped receiver for the wheel, said receiver being yieldingly supported above the floor, and resilient uprights extending above the base portion, at the ends thereof, and having means for engaging the sides of the wheel-tire.

4. A bicycle-stand comprising in its construction, the horizontal trough $a$, and the wire rigidly connected with the sides of the trough and bent to form portions $b$, diverging from the ends of the sides of the trough, and also bent to form coils or feet $c\ c$, inwardly-inclined uprights $d\ d$, and retaining-loops $e\ e$, substantially as and for the purposes specified.

In testimony whereof I affix my signature in presence of two subscribing witnesses.

GEORGE C. HAUBS.

Witnesses:
HOWARD B. YOST,
J. FRED. KELLEY.